3,483,200
NOVEL BICYCLIC PYRIMIDINE DERIVATIVES
Richard William James Carney, Murray Hill, N.J., Herbert Morton Blatter, Basel, Switzerland, and George de Stevens, Summit, N.J., assignors to Ciba Corporation, New York, N.Y., a corporation of Delaware
No Drawing. Continuation-in-part of application Ser. No. 488,241, Sept. 17, 1965, which is a continuation-in-part of application Ser. No. 427,151, Jan. 21, 1965, which in turn is a continuation-in-part of application Ser. No. 351,200, Mar. 11, 1964. This application June 7, 1966, Ser. No. 555,691
Int. Cl. C07d 87/38, 51/42; C09b 23/04
U.S. Cl. 260—247.5                                4 Claims This is a continuation-in-part of application Ser. No. 488,241, filed Sept. 17, 1965, which in turn is a continuation-in-part of application Ser. No. 427,151, filed Jan. 21, 1965, now U.S. Patent 3,385,850, granted May 28, 1968, which in turn is a continuation-in-part of application Ser. No. 351,200, filed Mar. 11, 1964, now abandoned.

The present invention concerns and has for its object the provision of bicyclic pyrimidine compounds and methods for their preparation.

More particularly the present invention relates to compounds of the formulae

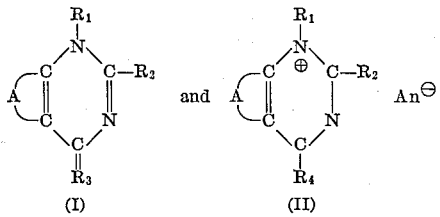

in which A stands for a divalent saturated or unsaturated aliphatic radical having from three to five carbon atoms as ring members and at most one double bond, each of the groups $R_1$ and $R_2$ for an aliphatic or aromatic radical, $R_3$ for an imino group, $R_4$ for an amino group, an aliphatically substituted hydroxy or mercapto group or an N-substituted azacyclic arylidenemethyl group in which the ring-nitrogen is part of an enamine grouping and $An^\ominus$ for the anion of an acid or the hydroxyl ion.

A divalent aliphatic radical representing the group A preferably stands for a lower alkylene or alkenylene radical having at least three carbon atoms, such as 1,3-propylene, 1,4-butylene, 2,2-dimethyl-1,4-butylene, 1,4- or 1,5-pentylene; 1,3-prop-1-enylene, 1,4-but-1-enylene, 1,4-but-2-enylene or 1,5-pent-1-enylene. These aliphatic radicals are preferably unsubstituted but may be substituted by one or more than one substituent located in any position available for substitution, such as etherified hydroxy, for example, lower alkoxy, such as methoxy, ethoxy, n- or i-propoxy or n-butoxy, esterified hydroxy, for example, halogeno, such as fluoro, chloro or bromo, trifluoromethyl, etherified mercapto, for example, lower alkylmercapto, such as methyl- or ethylmercapto, nitro, disubstituted amino, for example, di-lower alkyl-amino, such as dimethylamino or diethylamino, as well as oxo or thiono.

An aliphatic radical representing $R_1$ and $R_2$ is especially an alkyl radical having up to twelve carbon atoms, such as methyl, ethyl, n-propyl, isopropyl, n-butyl, n-pentyl, n-hexyl, n-heptyl, n-octyl, n-nonyl, n-decyl or n-undecyl. It may also be an alkenyl radical having up to twelve carbon atoms, such as allyl or undecenyl, a cycloaliphatic or cycloaliphatic-aliphatic radical, such as cycloalkyl or cycloalkyl-lower alkyl having from three to eight, especialy from five to seven, ring members, e.g. cyclopropyl, cyclopentyl, cyclohexyl, cycloheptyl, or cyclooctyl, cyclopropylmethyl, cyclopentylmethyl 2-cyclopentylethyl, cyclohexylmethyl, 1-cyclohexylethyl or cycloheptylmethyl, an araliphatic radical, such as monocyclic carbocyclic aryl-lower alkyl, e.g. benzyl, 1-phenylethyl or 2-phenylethyl.

An aromatic radical representing $R_1$ and $R_2$ is particularly a monocyclic carbocyclic aryl radical, e.g. phenyl or substituted phenyl. It may also be a bicyclic carbocyclic aryl radical, i.e. naphthyl or substituted naphthyl, or a heterocyclic, particularly monocyclic aryl radical, such as pyridyl, thienyl or furyl.

Said radicals $R_1$ and $R_2$ may be unsubstituted or may have one or more than one of the same or different substituents attached to any position available for substitution, especially in the aromatic portion. They are, for example, lower alkyl, e.g. methyl, ethyl, n-propyl or isopropyl, etherified hydroxy, such as lower alkoxy, e.g. methoxy, ethoxy, n-propoxy, isopropoxy or n-butoxy, esterified hydroxy, such as halogen, e.g. fluoro, chloro or bromo, trifluoromethyl, etherified mercapto, such as lower alkylmercapto, e.g. methylmercapto or ethylmercapto, nitro, disubstituted amino, such as di-lower alkylamino, e.g. dimethylamino or diethylamino, alkyleneimino in which alkylene has from four to six carbon atoms, e.g. pyrrolidino or piperidino, oxo or thiono.

A mono- or bicyclic carbocyclic aryl radical, therefore, is primarily phenyl, (lower alkyl)-phenyl, (lower alkoxy)-phenyl, (halogeno)-phenyl, (trifluoromethyl)-phenyl, (lower alkylmercapto)-phenyl, (nitro)-phenyl, (di-lower alkylamino)-phenyl, 1-naphthyl, 2-naphthyl, (lower alkyl)-naphthyl, (lower alkoxy)-naphthyl, (halogeno)-naphthyl, (trifluoromethyl)-naphthyl, (lower alkylmercapto)-naphthyl, (nitro)-naphthyl or (di-lower alkylamino)-naphthyl.

The aliphatic radicals $R_1$ and $R_2$ may also be interrupted by hetero atoms, preferably by one oxygen, sulfur and/or nitrogen atom. Such radicals are, for example, lower alkoxy-lower alkyl groups, such as methoxymethyl, ethoxymethyl, n-propoxymethyl, 1- or 2-methoxy-, ethoxy or i-propoxy-ethyl, 1-, 2- or 3-methoxy-, ethoxy or n-propoxy-propyl or 4-tert. butoxy-butyl, the corresponding phenoxy-lower alkyl and lower alkylmercapto-lower alkyl groups, mono- or di-lower alkylamino-lower alkyl, alkyleneimino-lower alkyl or aza-, oxa- or thia-alkyleneimino-lower alkyl or N-phenyl-azaalkyleneimino-lower alkyl groups with 4 to 6 ring-carbon atoms and in which latter the hetero-atom is preferably separated from the ring-nitrogen atom by at least two carbon atoms, such as 2-methylamino-, 2-dimethylamino- or 2-diethylamino-ethyl, 3-dimethylamino- or 3-diethylamino-propyl, 2-pyrrolidino-ethyl, 3-piperidino-propyl, 2-piperazino-ethyl, 2-(4-methyl-piperazino)-ethyl, 3-(4-ethyl-piperazino)-propyl, 2-(4-phenyl-piperazino)-ethyl, 2-morpholino-ethyl or 3-thiamorpholino-propyl.

The imino group $R_3$ can be unsubstituted, but preferably is substituted by the aliphatic or aromatic radicals mentioned for $R_1$ and $R_2$; furthermore by hydroxy, lower alkoxy, such as that mentioned above, hydroxy-lower alkyl, such as 2-hydroxy ethyl, 2- or 3-hydroxy-propyl or 2,3-dihydroxy-propyl, carboxy-lower alkyl or carbolower alkoxy-lower alkyl, such as carboxy-methyl, 2-carboxy-ethyl, carbethoxymethyl or 3-carbomethoxy-propyl, or heterocyclic aryl, such as pyridyl, e.g. 2-, 3- or 4-pyridyl, thienyl, e.g. 2-thienyl or furyl, e.g. 3-furyl.

An amino group $R_4$ may also be unsubstituted or substituted as shown for $R_3$. It preferably contains besides hydrogen or lower alkyl one of the aliphatic or aromatic radicals mentioned as substituent of the imino group $R_3$.

An aliphatically substituted hydroxy or mercapto group $R_4$ is especially lower alkoxy or lower alkylmercapto, but may also be a hydroxy or mercapto group containing those aliphatic radicals shown for $R_1$ and $R_2$.

The azacyclic arylidenemethyl group representing $R_4$ has, for example, the formula

in which $R_5$ is above all hydrogen, but may also stand for one of the radicals listed for $R_1$ and $R_2$ and Q stands for an N-substituted mono- or polycyclic, especially bicyclic, azacyclic arylidene radical, such as a 1-substituted 2- or 4-pyridylidene or 2- or 4-quinolylidene radical, a 2-substituted 1-isoquinolylidene radical, a 3-substituted 2-thiazolylidene, 2-benzothiazolylidene, 2-oxazolylidene or 2-benzoxazolylidene radical or a 1,3,3-trisubstituted 2-indolylidene radical in which the ring-nitrogen is part of an enamine grouping.

In the above azacyclic radicals representing Q, the substituent of the ring-nitrogen atom is above all a lower alkyl radical or one of the other radicals listed under $R_1$ and $R_2$. Apart from the group substituting the ring-nitrogen atom, the azacyclic ring is unsubstituted or may have one or more than one additional substituent, such as lower alkyl, etherified hydroxy, e.g. lower alkoxy, esterified hydroxy, e.g. halogeno, trifluoromethyl, etherified mercapto, e.g. lower alkylmercapto, nitro or disubstituted amino, e.g. di-lower alkyl-amino, of the meaning given above.

The ion $An^{\ominus}$ is above all the anion of an acid, primarily the anion of an inorganic acid, especially of a hydrohalic acid, e.g. hydrochloric, hydrobromic or hydriodic acid, or of sulfuric, thiocyanic or perchloric acid, as well as the anion of an organic acid, such as a carboxylic or sulfonic acid, e.g. acetic, oxalic, maleic, hydroxymaleic, fumaric, malic, tartaric, citric, benzoic or salicylic acid or more especially of methane, ethane or 2-hydroxyethane sulfonic, 1,2-ethane disulfonic, benzene sulfonic, p-toluene sulfonic or 2-naphthalene sulfonic acid or of a mono-basic organic sulfuric acid, such as a lower alkyl sulfuric acid, e.g. methyl or ethyl sulfuric acid, as well as the anion of an acidic organic nitro compound, e.g. picric, picrolonic or flavianic acid or of a metal complex acid, e.g. phosphotungstic, phosphomolybdic, chloroplatinic or Reinecke acid. In the event that the compounds of this invention are used for pharmaceutical purposes, the anion $An^{\ominus}$ is that of a pharmaceutically acceptable acid.

The compounds of this invention have valuable pharmacological properties. For example, they exhibit antimicrobial effects, such as against gram-positive bacteria, e.g. *Diplococcus pneumoniae* or *Staphylococcus aureus*, against gram-negative bacteria, e.g. *Escherichia coli, Pseudomonas aeruginosa* or *Salmonella cholerasius*, against acid-fast bacteria, e.g. Microbacterium tuberculosis, against fungi, e.g. *Candida albicans, Cryptococcus neoformans, Histoplasma capsulatum* or *Trichophyton mentagrophytes*, as well as against protozoa, e.g. *Trichomonas vaginalis* or *Trypanosoma cruzi*. They are, therefore, useful as antimicrobial agents, either topically or systemically, against bacterial, fungal, or protozoal infections. They also show activities against helmints, such as *Nippostrongylus muris* and the like, especially those compounds of Formula II, in which $R_4$ stands for an N-substituted azacyclic arylidenemethyl group, which can be demonstrated, for example, in mice at oral doses between about 50 and 250 mg./kg./day, preferably at about 100 mg./kg./day. They are, therefore, also useful as anthelmintic agents. Furthermore they exhibit anti-inflammatory effects, especially those compounds of the Formulae I and II in which $R_3$ and $R_4$ stands for an imino or amino group respectively. This can be demonstrated, for example, in the granuloma pouch test or the carrageenin rat paw test, at oral doses between about 5 and 50 mg./kg./day, preferably between about 10 and 25 mg./kg./day. They are, therefore, useful as anti-inflammatory agents, preferably for oral application, in place of corticosteroids, such as cortisone or hydrocortisone, in the treatment of tissue inflammations, such as arthritic inflammations and similar conditions.

The compounds of Formula II in which $R_4$ stands for an N-substituted azacyclic arylidenemethyl group represent also cyanine dyes containing at least two auxochromic nitrogen atoms, one being of tertiary, the other of quaternary characteristics. One of these nitrogen atoms is the ring member of one heterocyclic ring system, the second of another heterocyclic ring system, and both are linked with each other through a chain of conjugated double bonds. These dyes are also excellent sensitizers of photographic emulsions without causing excessive fog or residual dye stain.

Especially useful are the compounds of the formulae

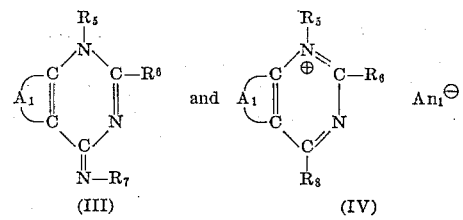

in which $A_1$ stands for alkylene having from three to five carbon atoms, each of the groups $R_5$ and $R_6$ for alkyl having up to 12 carbon atoms, monocyclic carbocyclic aryl-lower alkyl or monocyclic carbocyclic aryl, $R_7$ for hydrogen, lower alkyl, amino-lower alkyl, mono- or di-lower alkylamino-lower alkyl, alkyleneimino-lower alkyl in which alkylene has from four to six carbon atoms, aza- oxa- or thiaalkyleneimino-lower alkyl in which the heteroatom is separated from the ring-nitrogen by at least two carbon atoms and the ring has from four to six carbon atoms, carboxy-lower alkyl or carbo-lower alkoxy-lower alkyl, $R_8$ for lower alkylmercapto, di-lower alkylamino or an at most bicyclic N-lower alkyl-azacyclic, -thiazacyclic or -oxazacyclic arylidenemethyl group in which the ring-nitrogen is part of an enamine grouping and $An_1^{\ominus}$ for a halogenid ion.

Particularly valuable are those compounds of the Formula III and IV, in which $A_1$ stands for 1,4-butylene, $R_5$ for alkyl with up to 12 carbon atoms, phenyl, (lower alkyl)-phenyl, (lower alkoxy)-phenyl, (halogeno)-phenyl, (lower alkylmercapto)-phenyl or (nitro)-phenyl, $R_6$ for phenyl, (lower alkyl)-phenyl, (lower alkoxy)-phenyl, (halogeno)-phenyl, (lower alkylmercapto)-phenyl or (nitro)-phenyl, $R_7$ for lower alkyl, $R_8$ for lower alkylmercapto, di-lower alkylamino, 1-lower alkyl-2- or -4-pyridylidenemethyl, -2- or -4-quinolylidenemethyl, 2-lower alkyl-1-isoquinolylidenemethyl, 3-lower alkyl-2-thiazolylidenemethyl, -2-benzothiazolylidenemethyl, -2-oxazolylidenemethyl, -2-benzoxazolylidenemethyl or 1,3,3-tri-lower alkyl-2-indolylidenemethyl or one of these radicals having lower alkyl, lower alkoxy, halogeno, lower alkylmercapto, nitro or di-lower alkyl-amino as substituents, and $An_1^{\ominus}$ for a halogenid ion.

The compounds of this invention are prepared according to known methods. For example, the process for their preparation consists in:

(a) Reacting a compound of the formula

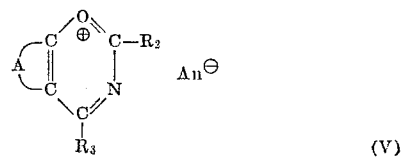

with the amine $R_1$—$NH_2$ or (b) Treating a compound of the formula

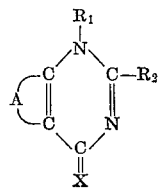

(VI)

in which X stands for an oxo or thiono group, with ammonia, a primary amine or a reactive ester of an aliphatic alcohol and, if desired, treating a reaction product obtained from the reactive ester, with ammonia, an amine containing at least one hydrogen atom or a quaternary n-substituted azacyclic arylmethyl compound of which the methyl group contains at least two hydrogen atoms and the ring-nitrogen is capable of forming an enamine grouping and/or treating a product obtained, containing a free or mono-substituted imino or amino group respectively, with a reactive ester of an aliphatic or aromatic alcohol and/or converting in a quaternary compound obtained, the anion into the hydroxyl ion or another anion.

A reactive ester of the aliphatic alcohol used in reaction (b) is, for example, an ester of an inorganic acid, particularly a hydrohalic acid, e.g. hydrochloric, hydrobromic or hydriodic acid, as well as of sulfuric acid, or of a suitable organic acid, especially a strong organic sulfonic acid, e.g. methane sulfonic, 2-hydroxyethane sulfonic or p-toluene sulfonic acid.

The quaternary arylmethyl compound more particularly is that of the formula $[Q_0—CH_2—R_5]^\oplus An^\ominus$, in which $Q_0$ stands for a quaternary N-substituted azacyclic aryl group capable of furnishing the group Q. $Q_0$ is more especially a quaternary 2- or 4-pyridyl, 2- or 4-quinolyl, 1-isoquinolyl, 2-thiazolyl, 2-benzothiazolyl, 2-oxazolyl, 2-benzoxazolyl or 3,3-disubstituted 2-indolenyl group in which the group attached to the quaternary nitrogen atom is above all lower alkyl, whereas $R_5$ has the previously-given meaning, but represents primarily hydrogen, and $An^\ominus$ is above all a halogenid ion.

The above reactions are carried out in the usual manner by combining the reactants in the absence or advantageously in the presence of a diluent, preferably such that is inert to the reactants and is a solvent thereof, in the presence or absence of a catalyst, condensing or neutralizing agent, while cooling, at room temperature or advantageously at elevated temperatures, under atmospheric or superatmospheric pressure and/or in the atmosphere of an inert gas, e.g. nitrogen.

A neutralizing agent is preferably used in the reaction with the reactive esters and quaternary arylmethyl compounds. Such agent is, for example, an alkali or alkaline earth metal lower alkoxide or carbonate, e.g. sodium, potassium, magnesium or barium methoxide, ethoxide, n-propoxide, isopropoxide or n-butoxide, sodium, potassium or calcium carbonate, or, more especially an organic base, such as pyridine or collidine, but particularly an aliphatic tertiary amine, such as a tri-lower alkylamine, e.g. trimethylamine, N,N-dimethyl-N-ethyl-amine or triethylamine, as well as an N,N,N',N'-tetra-lower alkyl-alkylenediamine, e.g. tetramethyl-1,6-hexylenediamine, an N-lower alkyl-alkyleneimine, e.g. N-methyl-pyrrolidine, N-methyl-piperidine or N-ethyl-piperidine, an N-lower alkyl-morpholine, e.g. N-methyl-morpholine or a mixture thereof, such as a mixture of pyridine and triethylamine.

In a resulting quaternary compound the anion may be converted into another anion according to known methods. Thus, the anion of an acid may be replaced by the hydroxyl ion, for example, by reacting a resulting quaternary halide with silver oxide or a quaternary sulfate with barium hydroxide, by treating a quaternary salt with an anion exchange preparation, or by electrodialysis. From a resulting quaternary hydroxide, there may be obtained quaternary salts by reacting the quaternary base with an acid, for example, one of those previously mentioned. A resulting quaternary salt may also be converted directly into another quaternary salt without the formation of an intermediate quaternary hydroxide. For example, a quaternary iodide may be reacted with freshly prepared silver chloride or with hydrochloric acid in anhydrous methanol to yield the quaternary chloride; a quaternary salt may also be converted into another quaternary salt by treatment with an anion exchange preparation.

The starting materials used in the above procedure are new and are intended to be included within the scope of this invention. They are especially those corresponding to the compounds of Formulae III and IV.

The starting material of Formula VI is prepared, for example, by reacting an enamine compound of the formula

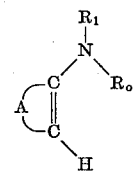

(VII)

in which $R_0$ stands for hydrogen, with a compound of the formula $R_2$—CO—N=C=X, in which X stands for oxo or thiono and, if desired, converting in a resulting compound having an oxo group in the 4-position of the pyrimidine portion, such group into the thiono group.

The compounds of Formula VII are prepared by treating the corresponding saturated cyclic ketone with the amine $R_1$—NH—$R_0$ if necessary, while removing water, for example, by azeotropic distillation. The N-acylated isocyanate and N-acylated isothiocyanate reagents may be obtained, for example, by reacting silver nitrate with an alkali metal, e.g. sodium or potassium, isocyanate or isothiocyanate in the presence of a suitable diluent, e.g. diethyl ether and adding the slurry of the resulting silver isocyanate or silver isothiocyanate to a diethyl ether solution of the acyl halide $R_2$—CO—Hal. The resulting precipitate is filtered off, the filtrate is evaporated and, if necessary, the desired N-acyl-isocyanate or N-acyl-isothiocyanate compound is purified, for example, by distillation.

Said starting materials are also obtained, for example, by reacting an enamine compound of the Formula VII, in which each of $R_1$ and $R_0$ stands for lower alkyl or, more especially, together for alkylene with four to seven carbon atoms, particularly 1,4-butylene or 1,5-pentylene as well as 3-oxa-1,5-pentylene, with a compound of the formula $R_2$—CO—N=C=X and reacting the resulting compound of the formula

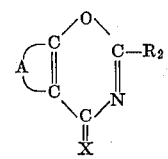

(VIII)

with the amine $R_1$—$NH_2$ and, if desired, converting prior or after said reaction an oxo group X into the thiono group.

The starting materials of Formula VI, particularly those, in which $R_1$ and $R_2$ represent aryl radicals, are also prepared by reacting an enamine compound of the Formula VII in which $R_1$ and $R_0$ have the last-given meaning, with an imidoyl-isocyanate or isothiocyanate compound of the formula

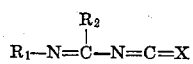

and, if desired, converting in a resulting compound an oxo group into the thiono group. The imidoyl-isocyanate and imidoyl-isothiocyanate reagents are prepared from the corresponding halides, e.g. chlorides, by treatment with a metal, e.g. potassium or lead, cyanate or thiocyanate.

The conversion of an oxo group in the 4-position of the pyrimidine portion may be carried out, for example, by treatment with phosphorus pentasulfide in the presence of a highboiling solvent, e.g. xylene.

The starting materials used in reaction (a) are prepared, for example, by reacting the intermediate compounds of the Formula VIII with a reactive ester of an aliphatic alcohol and, if desired, converting in the resulting compound the etherified hydroxy or mercapto group into an amino group or an N-substituted azacyclic arylidenemethyl group analogous to reaction (b).

The present invention also comprises any modification of the process, wherein a compound obtainable as an intermediate at any stage of the process is used as starting material and any remaining steps are carried out, or the process is discontinued at any stage thereof, or in which the starting materials are formed under the reaction conditions or are used in the form of their salts.

In the process of this invention, those starting materials are preferably used which lead to final products mentioned hereinbefore as being the preferred embodiments of the invention.

The compounds of this invention are useful in the form of compositions for enteral, parenteral or topical administration, which contains a pharmacologically effective amount of the compounds of this invention in admixture with a pharmaceutically acceptable, organic or inorganic, solid or liquid, carrier, which usually represents the major portion of the pharmaceutical composition. For making up the latter, there are employed carrier materials suitable for the preparation of pharmaceutical compositions, such as water, gelatin, sugars, e.g. lactose, glucose or sucrose, starches, e.g. corn starch, wheat starch or rice starch, stearic acid or salts thereof, e.g. calcium stearate or magnesium stearate, talc, vegetable oils, ethyl alcohol, benzyl alcohol, cetyl alcohol, petrolatum, gums, acacia, propylene glycol, polyalkylene glycols or any other known carrier for pharmaceutical compositions. The pharmaceutical preparations may be in solid form, e.g. capsules, tablets or dragees, in liquid form, e.g. solutions or suspensions, or in the form of emulsions, e.g. salves or creams. If desired, they may contain auxiliary substances, such as preserving, stabilizing, wetting, emulsifying or coloring agents, salts for varying the osmotic pressure or buffers. The above preparations are prepared according to the standard methods used for the manufacture of pharmaceutically acceptable compositions, which, if desired, may contain, in combination, other physiologically useful substances.

In order to be used as cyanine dyes in the sensitization of photographic silver halide emulsions, the arylidenemethyl compounds of this invention are dispersed in the emulsions, such as gelatino-silver halide emulsions, e.g. gelatino-silver bromide, gelatino-silver bromo-iodo, gelatino-silver chloride or gelatino-silver chloro-iodide. The methods of incorporating these dyes in emulsions are conventional and are described in the art.

The following examples are intended to illustrate the invention and are not to be construed as being limitations thereon. Temperatures are given in degrees centigrade and all parts wherever given are parts by weight.

EXAMPLE 1

A mixture of 6.2 g. of 1,2-diphenyl-1,4,5,6,7,8-hexahydro-quinazolin-4-thione and 2.8 g. of methyl iodide in 200 ml. of acetone is refluxed for two hours. A yellow precipitate is formed which is filtered off and recrystallized from acetone to yield the 1,2-diphenyl-4-methylmercapto - 5,6,7,8 - tetrahydroquinazolinium iodide of the formula

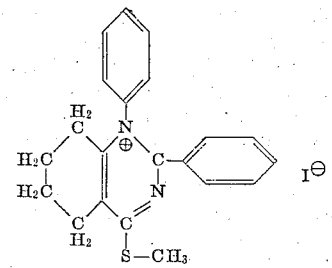

which melts at 261–263°; yield: 5.3 g.

The starting material used in the above procedure is prepared as follows: A mixture of 98.0 g. of cyclohexanone and 131.0 g. of morpholine in 300 ml. of benzene is reflxed overnight while separating the generated water in a water separator. The benzene is removed and the 1-(4-morpholino)-cyclohexene is distilled and collected at 182–185°/125 mm.

A solution of 55.0 g. of 1-(4-morpholino)-cyclohexene in 45 ml. of chloroform is added to 107 g. of N-benzoyl-isothiocyanate in 150 ml. of chloroform over a period of one hour while cooling and stirring in an atmosphere of nitrogen. The ice-bath is removed, and the reaction mixture is refluxed for thirty minutes and is then allowed to stand overnight. The precipitate is filtered off, and washed with diethyl ether and methanol; the 2-phenyl-5,6,7,8-tetrahydro - 1,3 - benzoxazin-4-thione melts at 197–199° after recrystallization from N,N-dimethylformamide.

A mixture of 5.0 g. of 2-phenyl-5,6,7,8-tetrahydro-1,3-benzoxazin-4-thione and 15.0 g. of aniline is refluxed for one hour. After cooling, 50 ml. of ethanol is added, and refluxing is continued for two additional hours. The crystalline material is filtered off; the 1,2-diphenyl-1,4,5,6,7,8-hexahydro-quinazolin-4-thione of the formula

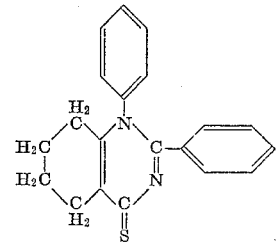

melts at 262–263° after recrystallization from ethanol; yield: 4.2 g.

The starting material used in the above procedure is also prepared as follows: A mixture of 50.0 g. of cyclohexanone and 70.0 g. of aniline in 200 ml. of benzene is refluxed for 2½ days using a water-separator to remove the generated water. The solvent is removed under reduced pressure, and the residue is distilled to yield the 1-anilino-cyclohexene, which is collected at 106–111°/1 mm.

To a solution of 5.5 g. of N-benzoyl-isothiocyanate in 20 ml. of diethyl ether is added over a period of thirty minutes 8.0 g. of 1-anilino-cyclohexene in 20 ml. of diethyl ether while cooling and maintaining an atmosphere of nitrogen. The orange precipitate is filtered off and washed with diethyl ether and methanol to yield the N-phenyl - thionoanthranilic acid N-benzoylamide, which melts at 85–87°.

A solution of 0.3 g. of N-phenyl-thionoanthranilic acid N-benzoyl-amide in 10 ml. of tetrahydrofuran is refluxed for one hour; an additional 90 ml. of tetrahydrofuran is added, and refluxing is continued for two hours. The precipitate is collected to yield the 1,2-diphenyl-1,4,5,6,7,8-hexahydro-quinazolin-4-thione, M.P. 265–267°.

The latter is also obtained directly by adding over a period of one hour, 6.0 g. of 1-anilino-cyclohexene in 25. of tetrahydrofuran to a solution of 5.5 g. of N-benzoyl-isothiocyanate in 25 ml. of tetrahydrofuran while cooling in an ice bath under an atmosphere of nitrogen. The precipitate is recrystallized from ethanol to yield the desired 1,2-diphenyl-1,4,5,6,7,8-hexahydro-quinazolin-4-thione, M.P. 263–265°.

The starting material may also be obtained according to the following procedure: A mixture of 23.9 g. of benzoic acid N-phenyl-amide and 22.0 g. of thionyl chloride is refluxed on the steam bath for six hours; the excess of thionyl chloride is evaporated under reduced pressure, the residue crystallizes upon cooling and is recrystallized from pentane to yield the N-phenyl-benzimidoyl chloride, which melts at 40°; yield: 19.5 g., and is identical with the compound described by Von Braun et al., Ber., vol. 67, p. 1218 (1934).

A mixture of 2.15 g. of N-phenyl-benzimidoyl chloride and 3.23 g. of lead thiocyanate in 30 ml. of dry benzene is refluxed for two hours. The mixture is filtered and evaporated to dryness under reduced pressure. The residue is triturated with dry pentane; the solid material is filtered off and the filtrate is evaporated to dryness under reduced pressure at room temperature. The residue is dissolved in 15 ml. of dry p-dioxane, and the solution containing the N-phenyl-benzimidoyl isothiocyanate is cooled in an ice-bath. To this solution is added dropwise 1.57 g. of 1-(4-morpholino)cyclohexene while cooling. Upon standing overnight at room temperature, the 1,2-diphenyl - 1,4,5,6,7,8 - hexahydroquinazolin-4-thione precipitates, M.P. 260–274°.

EXAMPLE 2

A mixture of 3.8 g. of 1-n-decyl-2-phenyl-1,4,5,6,7,8-hexahydro-quinazolin-4-thione and 2.13 g. of methyl iodide in 50 ml. of acetone is shaken until a complete solution is obtained. The solvent is then removed under reduced pressure, and the desired 1-n-decyl-4-methylmercapto-2-phenyl-5,6,7,8-tetrahydroquinazolinium iodide of the formula

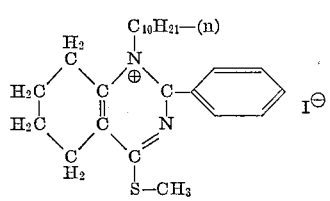

is obtained as a brown viscous oil, which is not further purified.

The starting material used in the above procedure is prepared as follows: A mixture of 4.0 g. of 2-phenyl-5,6,7,8-tetrahydro-1,3-benzoxazin-4-thione and 10 ml. of n-decylamine in 50 ml. of ethanol is refluxed for twenty minutes. The resulting solid material is filtered off; the desired 1 - n - decyl - 2-phenyl-1,4,5,6,7,-hexahydro-quinazolin-4-thione of the formula

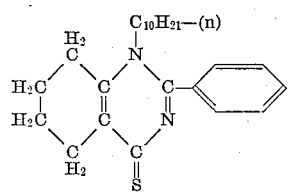

melts at 155–156° after recrystallization from ethanol.

EXAMPLE 3

A mixture of 4.1 g. of 1-(4-fluoro-phenyl)-2-phenyl-1,4,5,6,7,8-hexahydro-quinazolin-4-thione and 1.7 g. of methyl iodide in 300 ml. of acetone is refluxed for four hours. After cooling, the precipitate is filtered off to yield the 1-(4-fluorophenyl)4-methylmercapto-2-phenyl-5,6,7,8-tetrahydro-quinazolinium iodide of the formula

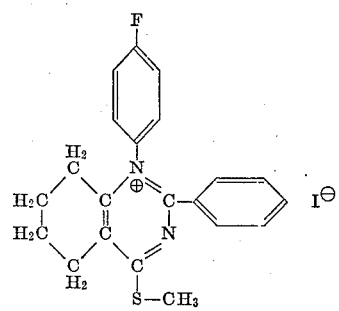

which melts at 257–258° after recrystallization from acetone.

The starting material used in the above procedure is prepared as follows: A mixture of 5.0 g. of 2-phenyl-5,6,7,8-tetrahydro-1,3-benzoxazin-4-thione and 9.0 g. of 4-fluoro-aniline in 50 ml. of ethanol is refluxed for four hours. The yellow precipitate is filtered off and recrystallized from ethanol to yield the 1-(4-fluoro-phenyl)-2-phenyl - 1,4,5,6,7,8 - hexahydro-quinazolin-4-thione of the formula

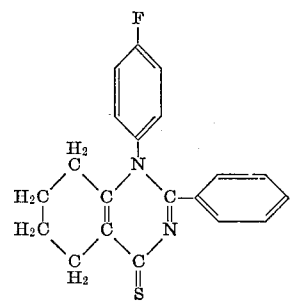

which melts at 307–310°.

EXAMPLE 4

The 1 - (4 - fluoro-phenyl) - 4 - methylmercapto-2-(4-methylphenyl)-5,6,7,8-tetrahydro-quinazolinium iodide is obtained by reacting a mixture of 6.7 g. of 1-(4-fluoro-phenyl) - 2 - (4 - methylphenyl)-1,4,5,6,7,8-hexahydro-quinazolin-4-thione and 2.8 g. of methyl iodide in 200 ml. of ethanol according to the procedure described in Example 1.

The starting material used in the above procedure is prepared as follows: To a cold solution of 7.5 g. of 4-fluoro-aniline in 25 ml. of pyridine is added dropwise 10.5 g. of crude 4-methylbenzoyl chloride. The resulting mixture is poured into approximately 250 ml. of water; the precipitate is filtered off, dried and recrystallized from methanol using a charcoal preparation for decolorization. The desired 4-methyl-benzoyl N-(4-fluoro-phenyl)-amide melts at 185–188°.

A mixture of 10.0 g. of 4-methyl-benzoyl N-(4-fluorophenyl)amide and 25 ml. of thionyl chloride is refluxed overnight and is then evaporated under reduced pressure. The residue is recrystallized from a mixture of diethyl ether and pentane to yield the N-(4-fluoro-phenyl) 4-methyl-benzimidoyl chloride, M.P. 88–91°.

A mixture of 5.6 g. of N-(4-fluoro-phenyl)-4-methyl-benzimidoyl chloride and 7.45 g. of lead thiocyanate in 50 ml. of dry benzene is refluxed for two hours and is then filtered. The filtrate is concentrated to dryness under reduced pressure and the residue is triturated with dry pentane. The solid material is filtered off; the pentane solution is concentrated and cooled to yield the N-(4-fluoro-phenyl)-4-methyl-benzimidoyl isothiocyanate which melts at 77–79° after recrystallization from pentane.

To a solution of 1.67 g. of 1-(4-morpholino)-cyclohexene in 10 ml. of dry p-dioxane is added dropwise a solution of 2.7 g. of the N-(4-fluoro-phenyl)-4-methyl-benzimidoyl isothiocyanate in 15 ml. of dry p-dioxane. The solution is allowed to stand at room temperature overnight after having been seeded with a small amount of 1-(4-fluoro - phenyl) - 2 - (4 - methyl - phenyl) - 1,4,5,6,7,8-hexahydroquinazolin-4-thione. The product melts at 291–293° after recrystallization from acetone.

EXAMPLE 5

The 2 - (4 - chloro-phenyl) - 1 - (4 - fluoro-phenyl) - 4-methylmercapto - 5,6,7,8 - tetrahydro-quinazolinium iodide is prepared by reacting a mixture of 7.1 g. of 2-(4-chloro - phenyl) - 1 - (4 - fluorophenyl) - 1,4,5,6,7,8 - hexahydro-quinazolin-4-thione and 3.0 g. of methyl iodide in 200 ml. of ethanol as described in Example 1.

The starting material used in the above procedure is prepared as described in Example 4, i.e. by reacting 4-chloro-benzoyl chloride with 4-fluoro-aniline, treating the resulting 4 - chloro-benzoyl N-(4-fluoro-phenyl)-amide (M.P. 179–181° after recrystallization from ethanol) with thionyl chloride, converting the N-(4-fluoro-phenyl) 4-chloro-benzimidoyl chloride (M.P. 78–80° after recrystallization from pentane) into the N-(4-fluoro-phenyl) 4-chloro-benzimidoyl isothiocyanate by treatment with lead thiocyanate, and reacting the N-(4-fluoro-phenyl) 4-chloro - benzimidoyl isothiocyanate (M.P. 85–87° after recrystallization from pentane) with 1-(4-morpholino)-cyclohexene; the 2-(4-chlorophenyl)-1-(4-fluoro-phenyl)-1,4,5,6,7,8-hexahydro-quinazolin-4-thione of the formula

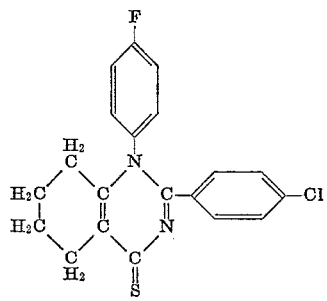

melts above 300° after recrystallization from acetone.

EXAMPLE 6

A mixture of 7.0 g. of 1-(4-fluoro-phenyl)-2-(4-methoxyphenyl) - 1,4,5,6,7,8 - hexahydro-quinazolin-4-thione and 3.0 g. of methyl iodide in 200 ml. of ethanol, when reacted as described in Example 1 yields the 1-(4-fluoro-phenyl) - 2 - (4 - methoxy-phenyl)-4-methylmercapto-5,6,7,8-tetrahydro-quinazolinium iodide.

The starting material used in the above procedure is prepared as described in Example 4, i.e. by reacting 4-methoxy-benzoyl chloride with 4-fluoro-aniline to form the 4-methoxy-benzoyl N-(4-fluoro-phenyl)-amide, which is treated with thionyl chloride; the resulting N-(4-fluoro-phenyl)-4-methoxy-benzimidoyl chloride is reacted with lead thiocyanate, and the N-(4-fluoro-phenyl) 4-methoxy-benzimidoyl isothiocyanate is converted into the 1-(4-fluorophenyl) - 2 - (4-methoxy-phenyl)-1,4,5,6,7,8-hexahydro-quinazolin-4-thione of the formula

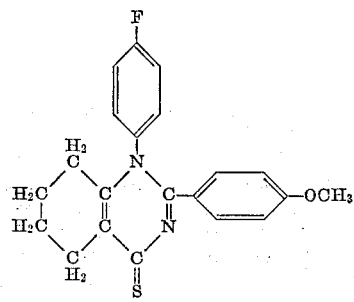

by reacting it with 1-(4-morpholino)-cyclohexene.

EXAMPLE 7

Other compounds of this invention, which are prepared according to the above-described and illustrated procedure by selecting the appropriate starting materials, are, for example, 1,2 - diphenyl - 4 - methylmercapto-cyclopenta[e]pyrimidinium iodide, prepared by reacting cyclopentanone with morpholine and removing the generated water, reacting the 1-(4-morpholino)-cyclopentene with N-benzoyl-isothiocyanate, and the resulting 2-phenyl-cyclopenta[e] 1,3-benzoxazin-4-thione with aniline, and quaternizing the 1,2 - diphenyl - 1,4 - dihydro-cyclopenta[e]pyrimidin-4-thione with methyl iodide;

1 - (4 - methoxy - phenyl ) - 4 - methylmercapto - 2-phenyl-cyclpenta[e]pyrimidinium iodide, prepared by reacting 2 - phenyl - cyclopenta[e]1,3 - benzoxazin - 4 - thione with p-anisidine, and quaternizing the 1-(4-methoxyphenyl) - 2 - phenyl - 1,4 - dihydro - cyclopenta[e]pyrimidin - 4 - thione with methyl iodide;

2 - benzyl - 1 - (4 - chloro-phenyl) - 4 - ethylmercapto-5,6,7,8 - tetrahydroquinazolinium iodide, prepared by reacting 1 - (4 - morpholino)-cyclohexene with N-phenacetyl-isothiocyanate, treating the resulting 2 - benzyl-5,6,7,8 - tetrahydro - 1,3 - benzoxazin - 4 - thione with 4 - chloroaniline, and quaternizing the 2 - benzyl - 1 - (4-chloro-phenyl) - 1,4,5,6,7,8 - hexahydro-quinazolin - 4 - thione with ethyl iodide;

4 - benzyl mercapto - 2 - ethyl - 1 - (4 - methyl-phenyl)-5,6,7,8 - tetrahydro-quinazolinium bromide, prepared by reacting 1 - (4 - morpholino)-cyclohexene with N-propionyl-isothiocyanate, treating the resulting 2 - ethyl-5,6,7,8-tetrahydro - 1,3 - benzoxazin - 4 - thione with p-toluidine, and quaternizing the 2 - ethyl - 1 - (4 - methyl-phenyl)-1,4,5,6,7,8 - hexahydro-quinazolin-4-thione with benzyl bromide;

2 - (4 - bromo - phenyl) - 1 - methyl - 4 - methylmercapto - 5,6,7,8 - tetrahydro-quinazolinium iodide, prepared by reacting 1 - (4 - morpholino)-cyclohexene with N-(4-bromo-benzoyl)-isothiocyanate, treating the resulting 2 - (4-bromo-phenyl)-5,6,7,8-tetrahydro-1,3-benzoxazin - 4 - thione with methylamine, and quaternizing the 2 - ( 4 - bromo - phenyl) - 1 - methyl - 1,4,5,6,7,8-hexahydro-quinazolin-4-thione with methyl iodide;

4 - methylmercapto - 2 - phenyl - 1 - (4 - trifluoromethyl-phenyl) - 5,6,7,8 - tetrahydro-quinazolinium iodide, prepared by reacting 2-phenyl-5,6,7,8-tetrahydro-1,3 - benzoxazin - 4 - thione with p-trifluoromethylaniline and quaternizing the 2 - phenyl-1-(4-trifluoromethylphenyl) - 1,4,5,6,7,8-hexahydro-quinazolin-4-thione with methyl iodide;

4 - methylmercapto - 2 - (3 - nitro-phenyl) - 1 - phenyl-5,6,7,8 - tetrahydro-quinazolinium iodide, prepared by reacting 1 - (4 - morpholino) - cyclohexene with N-(3-nitro-benzoyl)-isothiocyanate, treating the resulting 2-(3-nitro-phenyl) - 5,6,7,8 - tetrahydro - 1,3 - benzoxazin - 4-thione with aniline, and quaternizing the 2 - (3 - nitro-phenyl) - 1 - phenyl - 5,6,7,8 - tetrahydro - 1,3 - benzoxazin - 4 - thione with methyl iodide;

4 - methylmercapto - 1 - (4 - methylmercapto-phenyl)-2 - phenyl - 5,6,7,8 - tetrahydro-quinazolinium iodide, prepared by reacting 2 - phenyl-5,6,7,8 - tetrahydro - 1,3 - benzoxazin - 4 - thione with 4 - methylmercaptoaniline and quaternizing the 1 - (4 - methylmercapto-phenyl)-2-phenyl - 1,4,5,6,7,8 - hexahydro-quinazolin - 4 - thione with methyl iodide;

1 - benzyl - 6 - methyl - 4 - methylmercapto - 2 - phenyl-5,6,7,8 - tetrahydro-quinazolinium iodide, prepared by reacting 4 - methyl - cyclohexanone with morpholine and removing the generated water, treating the 4 - methyl - 1 - (4 - morpholino) - cyclohexene with N-benzoyl-isothiocyanate, reacting the resulting 6-methyl-2-phenyl-5,6,7,8-tetrahydro - 1,3 - benzoxazin - 4 - thione with benzylamine, and quaternizing the 1 - benzyl - 6 - methyl - 2 - phenyl - 1,4,5,6,7,8 - hexahydro-quinazolin - 4 - thione with methyl iodide;

1,2 - diphenyl - 4 - methylmercapto - cyclohepta[e]pyrimidinium iodide, prepared by reacting cycloheptanone with morpholine and removing the generated water in a water separator, treating the 1-(4-morpholino)-cycloheptene with N-benzoyl-isothiocyanate, reacting the resulting 2-phenyl-cyclohepta[e]1,3-benzoxazin-4-thione with aniline, and quaternizing the 1,2-diphenyl-1,4-dihydro-cyclohepta[e]pyrimidine with methyl iodide; and the like.

EXAMPLE 8

A mixture of 1.0 g. of 4-(3-methyl-2-benzothiazolylidene - methyl) - 2 - phenyl - 5,6,7,8 - tetrahydro - 1,3-benzoxazinium iodide and 10 ml. of aniline is refluxed for one hour. After chilling, a precipitate is formed, which is filtered off and washed with diethyl ether to yield the 1,2 - diphenyl - 4 - (3 - methyl - 2 - benzothiazolylidenemethyl)-5,6,7,8-tetrahydro - quinazolinium iodide of the formula

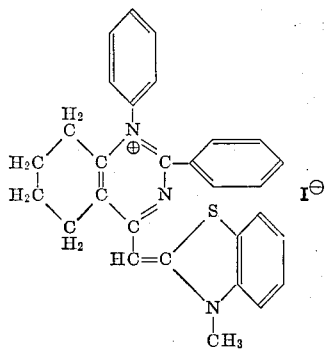

which melts at 312–314° after recrystallization from ethanol.

Other compounds, which are prepared by reacting 4-(3-methyl - 2 - benzothiazolylidene - methyl) - 2 - phenyl - 5,6,7,8-tetrahydro-1,3-benzoxazinium iodide with an amine, such as 4-fluoro-aniline, N,N-diethyl-1,2-ethylenediamine, n-propylamine, methylamine, N,N-dimethyl-1,2-ethylenediamine, 3-amino-pyridine, N,N-diethyl-1,4-phenylenediamine and the like, are, for example, 1-(4-fluoro-phenyl)-4 - (3 - methyl - 2 - benzothiazolylidene - methyl) - 2-phenyl-5,6,7,8-tetrahydro-quinazolinium iodide, M.P. 271–272° after recrystallization from ethanol; and 1-(2-N,N-diethylaminoethyl) - 4 - (3 - methyl - 2 - benzothiazolylidene - methyl) - 2 - phenyl - 5,6,7,8 - tetrahydro-quinazolinium iodide, M.P. 194–196° after recrystallization from ethanol; as well as 4-(3-methyl - 2 - benzothiazolylidenemethyl) - 2 - phenyl - 1 - n - propyl - 5,6,7,8 - tetrahydroquinazolinium iodide, M.P. 245–246° after recrystallization from ethanol; 1-methyl-4-(3-methyl-2-benzothiazolylidene - methyl) - 2 - phenyl - 5,6,7,8 - tetrahydro - quinazolinium iodide, 1-(2-dimethylamino-ethyl)-4-(3-methyl-2-benzothiazolylidene-methyl)-2 - phenyl - 5,6,7,8 - tetrahydro-quinazolinium iodide, M.P. 228–230° after recrystallization from methanol; 1-(3-pyridyl)-4-(3-methyl - 2-benzothiazolylidene - methyl) - 2 - phenyl - 5,6,7,8 - tetrahydro-quinazolinium iodide, M.P. 266–267° (decomp.) after recrystallization from methanol; 1-(4-diethylaminophenyl) - 4 - (3 - methyl - 2 - benzothiazolylidene - methyl) - 2 - phenyl - 5,6,7,8 - tetrahydro - quinazolinium -iodide, and the like.

The starting material used in the above procedure is prepared as follows: A mixture of 5.0 g. of 2-phenyl-5,6,7,8-tetrahydro-1,3 - benzoxazin - 4 - thione and 4.5 g. of methyl iodide in 80 ml. of acetone is refluxed for one hour and is then cooled. The precipitate is filtered off and washed with acetone to yield the 4-methylmercapto-2 - phenyl - 5,6,7,8 - tetrahydro - 1,3 - benzoxazinium iodide which melts at 183° (with decomp.) after drying.

A mixture of 23.0 g. of 4-methylmercapto-2-phenyl-5,6,7,8-tetrahydro-1,3-benzoxazinium iodide and 17.5 g. of 2-methyl-benzothiazole methiodide in 350 ml. of ethanol containing 10 ml. of triethylamine is heated just below reflux temperature for one hour. After cooling, the solid material is filtered off and washed with diethyl ether to yield the 4-(3-methyl-2-benzothiazolylidene - methyl) - 2-phenyl-5,6,7,8-tetrahydro-1,3-benzoxazinium iodide of the formula

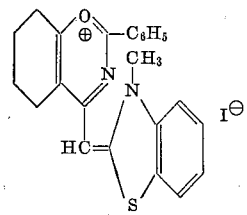

which melts at 313–314° after recrystallization from methanol.

EXAMPLE 9

A mixture of 3.2 g. of 4-(1-ethyl-2-quinolylidene-methyl) - 2 - phenyl - 5,6,7,8 - tetrahydro - 1, 3- benzoxazinium iodide and 20 ml. of 4-fluoro-aniline, when reacted as described in Example 8, yields the 4-(1-ethyl-2-quinolylidene - methyl) - 1 - (4 - fluoro - phenyl) - 2 - phenyl-5,6,7,8-tetrahydro-quinazolinium iodide of the formula

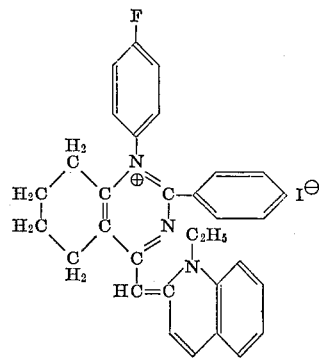

which melts at 252–253° after recrystallization from ethanol.

The starting material used in the above procedure is prepared as follows: A mixture of 10.0 g. of 4-methylmercapto - 2 - phenyl - 5,6,7,8 - tetrahydro - 1, 3- benzoxazinium iodide and 7.8 g. of 2-quinaldine ethiodide in 100 ml. of ethanol containing 4 ml. of N,N,N-triethylamine is refluxed for 2½ hours. After cooling, the precipitate is filtered off to yield the 4-(1-ethyl-2-quinolylidenemethyl) - 2 - phenyl - 5,6,7,8 - tetrahydro - 1,3 - benzoxazinium iodide of the formula

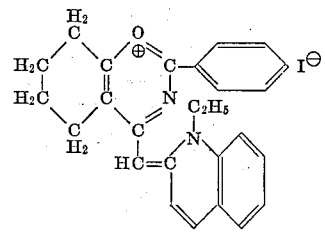

which melts at 256–258° (with decomposition).

EXAMPLE 10

A mixture of 2.5 g. of 1,2-diphenyl-4-methylmercapto-5,6,7,8-tetrahydro-quinazolinium iodide and 1.6 g. of 2-methylbenzothiazole methiodide in 50 ml. of ethanol and 2 ml. of N,N,N-triethylamine if refluxed for twenty-four hours. After cooling, the precipitate is filtered off and recrystallized from ethanol to yield the 1,2-diphenyl-4-(3-methyl - 2 - benzothiazolylidene-methyl) - 5,6,7,8 - tetrahydro-quinazolinium iodide, M.P. 312–314°, which is

EXAMPLE 11

A mixture of 2.5 g. of 1-(4-fluoro-phenyl)-4-methylmercapto - 2 - phenyl - 5,6,7,8 - tetrahydro-quinazolinium iodide and 1.5 g. of 2-methyl-benzothiazole methiodide in 325 ml. of methanol containing 3 ml. of N,N,N-triethylamine is refluxed overnight. The major portion of the solvent is removed under reduced pressure, and the solid material is filtered off. The resulting 1-(4-fluoro-phenyl)-4 - (3-methyl-2-benzothiazolylidene-methyl)-2-phenyl-5,6,7,8-tetrahydro-quinazolinium iodide melts at 271–272° after recrystallization from ethanol and is identical with the product obtained according to the procedure described in Example 8.

EXAMPLE 12

A mixture of 0.5 g. of 1-(4-fluoro-phenyl)-4-methylmercapto - 2 - phenyl - 5,6,7,8 - tetrahydro-quinazolinium iodide and 0.3 g. of 2-quinaldine methiodide in 10 ml. of ethanol and 0.5 ml. of N,N,N-triethylamine, when reacted as described in Example 11, yields the 1-(4-fluoro-phenyl)-4 - (1 - methyl - 2-quinolylidene-methyl)-2-phenyl-5,6,7,8-tetrahydro-quinazolinium iodide of the formula

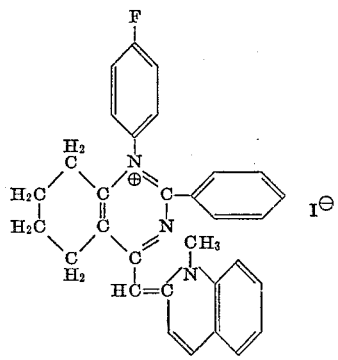

which melts at 220–223°.

EXAMPLE 13

A mixture of 3.0 g. of 1-n-decyl-4-methylmercapto-2-phenyl-5,6,7,8-tetrahydro-quinazolinium iodide and 2.25 g. of 2-methyl-benzothiazole methiodide in 50 ml. of ethanol containing a few drops of N,N,N-triethylamine is refluxed overnight. The solvent is partially removed under reduced pressure, and upon cooling the desired 1-n-decyl-4-(3-methyl - 2 - benzothiazolylidene-methyl)-2-phenyl-5,6,7,8-tetrahydro-quinazolinium iodide of the formula

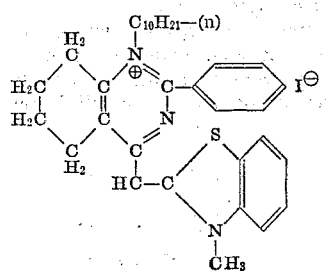

precipitates and is filtered off; it melts at 214–215° after recrystallization from ethanol.

EXAMPLE 14

Other compounds of this invention, which are prepared according to the above described and illustrated procedure, are the following:

1,2 - diphenyl-4-(1-methyl-pyridylidene-methyl)-cyclopenta[e]pyrimidinium iodide, prepared by reacting 1,2-diphenyl - 4-methylmercapto-cyclopenta[e]pyrimidinium iodide with 2-picoline methiodide in the presence of N,N,N-triethylamine;

1,2 - diphenyl-4-(3-methyl-2-benzothiazolylidene-methyl)-cyclopenta[e]pyrimidinium iodide, prepared by reacting the 2 - phenyl - cyclopenta[e]1,3-benzoxazin-4-thione with methiodide, treating the 4-methylmercapto-2-phenyl-cyclopenta[e]1,3 - benzoxazinium iodide with 2-methyl-benzothiazole methiodide in the presence of N,N,N-triethylamine, and converting the resulting 4-(3-methyl-2-benzothiazolylidene-methyl) - 2-phenyl-cyclopenta[e]1,3-benzoxazinium iodide into the desired compound by treatment with aniline;

1,2 - diphenyl-4-(1-ethyl-2-quinolylidene-methyl)-cyclopenta[e]pyrimidinium iodide, prepared by reacting 1,2-diphenyl - 4-methyl-mercapto-cyclopenta[e]pyrimidinium iodide with 2-quinaldine ethiodide in the presence of N,N, N-triethylamine;

1 - (4 - methoxy - phenyl)-4-(1-methyl-4-pyridylidene-methyl)-2-phenyl-cyclopenta[e]pyrimidinium iodide, prepared by reacting 1 - (4-methoxy-phenyl)-4-methylmercapto-2-phenyl-cyclopenta[e]pyrimidinium iodide with 4-picoline methiodide in the presence of N,N,N-triethylamine;

2 - benzyl - 1 - (4-chloro-phenyl)-4-(3-methyl-2-benzothiazolyl - methyl) - 5,6,7,8 - tetrahydro-quinazolinium iodide, prepared by reacting 2-benzyl-1-(4-chloro-phenyl)-4 - ethylmercapto-5,6,7,8-tetrahydroquinazolinium iodide with 2-methyl-benzothiazole methiodide in the presence of N,N,N-triethylamine;

2 - ethyl - 4-(2-methyl-1-isoquinolylidene-methyl)-1-(4-methyl - phenyl)-5,6,7,8-tetrahydro-quinazolinium iodide, prepared by reacting 2-ethyl-5,6,7,8-tetrahydro-1,3-benzoxazin-4-thione with methyl iodide, treating the 2-ethyl-4-methylmercapto - 5,6,7,8-tetrahydro1,3-benzoxazinium iodide with 1-methyl-isoquinoline methiodide in the presence of N,N,N-triethylamine, and treating the resulting 2-ethyl - 4 - (2 - methyl-1-isoquinolylidene-methyl)-5,6,7,8-tetrahydro-1,3-benzoxazinium iodide with p-toluidine;

2 - ethyl-4-(3-methyl-2-benzothiazolylidene-methyl)-1-(4 - methyl-phenyl)-5,6,7,8-tetrahydro-quinazolinium iodide, prepared by reacting 4-benzylmercapto-2-ethyl-1-(4-methyl-phenyl)-5,6,7,8-tetrahydro-quinazolinium bromide with a large excess of sodium iodide in water and treating the 4-benzylmercapto-2-ethyl-1-(4-methyl-phenyl)-5,6,7,8-tetrahydro-quinazolinium iodide with 2 - methyl-benzothiazole methiodide in the presence of N,N,N-triethylamine;

2 - (4-bromo-phenyl)-4-(6-N,N-diethylamino-1-methyl-2 - quinolylidene - methyl) - 1-methyl-5,6,7,8-tetrahydro-quinazolinium iodide, prepared by reacting 2-(4-bromo-phenyl) - 1 - methyl-4-methylmercapto-5,6,7,8-tetrahydroquinazolinium iodide with 6-N,N-diethylamino-2 - quinaldine methiodide in the presence of N,N,N-triethylamine;

4 - (3 - methyl-2-thiazolylidene-methyl)-2-phenyl-1-(4-trifluoromethyl-phenyl)-5,6,7,8-tetrahydro - quinazolinium iodide, prepared by reacting 4-methylmercapto-2-phenyl-1-(4-trifluoromethyl-phenyl)-5,6,7,8 - tetrahydro-quinazolinium iodide with 2-methyl-thiazole methiodide in the presence of N,N,N-triethylamine;

4 - (1-methyl-4-quinolylidene-methyl)-2-(3-nitro-phenyl)-1-phenyl-5,6,7,8-tetrahydro-quinazolinium iodide, prepared by reacting 4-methylmercapto-2-(3-nitro-phenyl)-1-phenyl - 5,6,7,8-tetrahydro-quinazolinium iodide with 4-quinaldine methiodide in the presence of N,N,N-triethylamine;

1,2 - diphenyl-4-(1-methyl-2-pyridylidene-methyl)-5,6,7,8-tetrahydro-quaniazolinium iodide, prepared by reacting 1,2 - diphenyl - 4-methylmercapto-5,6,7,8-tetrahydro-quinazolinium iodide with 2-picoline methiodide in the presence of N,N,N-triethylamine;

1,2 - diphenyl-4-(3-methyl-thiazolylidene-methyl)-5,6,7, 8-tetrahydro-quinazolinium iodide, prepared by reacting 4-methylmercapto-2-phenyl-5,6,7,8-tetrahydro-1,3-benzoxazinium iodide with 2-methyl-thiazole methiodide in the presence of N,N,N-triethylamine and reacting the 4-(3-methyl - 2-thiazolylidene-methyl)-2-phenyl-5,6,7,8-tetrahydro-1,3-benzoxazinium iodide with aniline;

1,2-diphenyl-4-(3-ethyl-2-oxazolylidene-methyl)-5,6,7,8-tetrahydroquinazolinium iodide, prepared by reacting 1,2-diphenyl - 4 - methylmercapto-5,6,7,8-tetrahydro-quinazolinium iodide with 2-methyloxazole ethiodide in the presence of N,N,N-triethylamine;

1,2 - diphenyl-4-(3-methyl-2-benzoxazolylidene-methyl)-5,6,7,8-tetrahydro-quinazolinium iodide, prepared by reacting 1,2-diphenyl-4-methylmercapto-5,6,7,8-tetrahydroquinazolinium iodide with 2-methyl-benzoxazole methiodide in the presence of N,N,N-triethylamine;

2 - (4-chloro-phenyl)-1-(4-fluoro-phenyl)-4-(3-methyl-2-benzothiazolylidene - methyl)-5,6,7,8-tetrahydro-quinazolinium iodide, prepared by reacting 2-(4-chloro-phenyl)-1-(4-fluoro-phenyl) - 4 - methylmercapto-5,6,7,8-tetrahydroquinazolinium iodide with 2-methylbenzothiazole methiodide in the presence of N,N,N-triethylamine;

1 - (4-fluoro-phenyl)-2-(4-methoxy-phenyl)-4-(1-methyl-2 - quinolylidene - methyl) - 5,6,7,8-tetrahydro-quinazolinium iodide, prepared by reacting 1-(4-fluoro-phenyl)-2-(4 - methoxy - phenyl)-4-methylmercapto-5,6,7,8-tetrahydro-quinazolinium iodide with 2-quinaldine methiodide in the presence of N,N,N-triethylamine;

4-(3-methyl-2-benzothiazolylidene-methyl)-1-(4-methylmercapto - phenyl) - 2-phenyl-5,6,7,8-tetrahydro-quinazolinium iodide, prepared by reacting 4-methylmercapto-1-(4 - methylmercapto-phenyl)-2-phenyl-5,6,7,8-tetrahydroquinazolinium iodide with 2-methyl-benzothiazole methiodide in the presence of N,N,N-triethylamine;

1 - benzyl - 6-methyl-4-(1-methyl-2-quinolylidene-methyl)-2-phenyl-5,6,7,8-tetrahydro-quinazolinium iodide, prepared by reacting 6-methyl-2-phenyl-5,6,7,8-tetrahydro-1,3-benzoxazin-4-thione with methyl iodide, treating the 6-methyl - 4 - methylmercapto-2-phenyl-5,6,7,8-tetrahydro-1,3-benzoxazinium iodide with 2-quinaldine methiodide in the presence of N,N,N-triethylamine, and reacting the 6-methyl - 4 - (1-methyl-2-quinolylidene-methyl)-2-phenyl-5,6,7,8-tetrahydro-1,3-benzoxazinium iodide with benzylamine;

1 - benzyl-4-(6-chloro-1-ethyl-4-quinolylidene-methyl)-2 - phenyl - 5,6,7,8-tetrahydro-quinazolinium iodide, prepared by reacting 1-benzyl-6-methyl-4-methylmercapto-2-phenyl-5,6,7,8-tetrahydro-quinazolinium iodide with 6-chloro-4-quinaldine methiodide in the presence of N,N,N-triethylamine;

1,2 - diphenyl - 4 - (1,3,3-trimethyl-2-indolylidene-methyl)-5,6,7,8-tetrahydro-quinazolinium iodide, prepared by reacting 1,2 - diphenyl-4-methylmercapto-5,6,7,8-tetrahydro-quinazolinium iodide with 2,3,3-trimethyl-indolenine methiodide in the presence of N,N,N-triethylamine;

1,2-diphenyl - 4 - (3-methyl-2-benzothiazolylidene-methyl)-cyclohepta[e]pyrimidinium iodide, prepared by reacting 1,2 - diphenyl-4-methylmercapto-cyclohepta[e]pyrimidinium iodide with 2-methylbenzothiazole methiodide in the presence of N,N,N-triethylamine;

1,2-diphenyl - 4 - (6-methoxy-1-methyl-2-quinolylidene-methyl)-cyclohepta[e]pyrimidinium iodide, prepared by reacting 1,2 - diphenyl - 4-methylmercapto-cyclohepta[e]pyrimidinium iodide with 6-methoxy-2-quinaldine methiodide in the presence of N,N,N-triethylamine; and the like.

EXAMPLE 15

The mixture of 3.3 g. of 4-(3-n-butyl-2-benzoxazolylidene - methyl) - 2-phenyl-5,6,7,8-tetrahydro-1,3-benzoxazinium iodide, 1.0 g. of n-decylamine and 250 ml. of methanol is refluxed for two hours. From the reaction mixture the methanol is distilled off and the remaining oil crystallizes on standing overnight. Upon recrystallization from 2-propanol there is obtained the pure yellow 1-n-decyl - 2-phenyl-4-(3-n-butyl-2-benzoxazolylidene-methyl)-5,6,7,8-tetrahydro-quinazolinium iodide of the formula

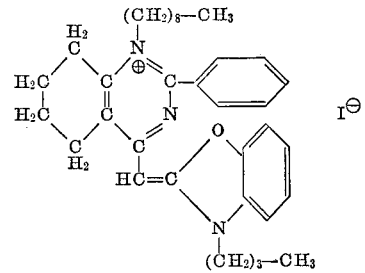

melting at 75°.

The starting material is prepared as follows:

10.0 g. of 2-methyl-benzoxazole and 17.0 g. of n-butyl iodide are mixed together and the whole is heated in a sealed tube to 150° for 48 hours. The solid formed is recrystallized from ethanol to yield the 3-n-butyl-2-methyl-benzoxazolinium iodide melting at 147–150°.

The mixture of 24.0 g. of 4-methylmercapto-2-phenyl-5,6,7,8-tetrahydro-1,3-benzoxazinium iodide, 13.0 g. of 3-n-butyl-2-methyl-benzoxazolinium iodide, 10 ml. of triethylamine and 50 ml. of methanol is refluxed for 4 hours. Upon cooling the solution is allowed to stand for one day and hereupon a small amount of diethyl ether is added. On cooling the 4-(3-n-butyl-2-benzoxazolylidene-methyl)-2 - phenyl - 5,6,7,8 - tetrahydro-1,3-benzoxazinium iodide crystallizes out. It is filtered off, washed with ice cold methanol-ether and dried; M.P. 260°.

In the analogous manner the following compounds are prepared by using the equivalent amounts of starting material:

(a) 1 - n - undecyl-2-phenyl-4-(3-ethyl-2-benzoxazolylidene - methyl) - 5,6,7,8 - tetrahydro-quinazolinium iodide, M.P. 181–183° after recrystallization from isopropanol;

(b) 1 - n-octyl-2-phenyl-4-(3-ethyl-2-benzoxazolylidene-methyl) - 5,6,7,8 - tetrahydro-quinazolinium iodide, M.P. 223–225° after recrystallization from isopropanol;

(c) 1 - n-decyl-2-phenyl-4-(3-n-propyl-2-benzoxazolylidene-methyl)-5,6,7,8-tetrahydro-quinazolinium iodide M.P. 174–176° after recrystallization from isopropanol;

(d) 1 - n-decyl-2-phenyl-4-(3-ethyl-2-benzoxazolylidene-methyl) - 5,6,7,8 - tetrahydro-quinazolinium iodide, M.P. 190–192° after recrystallization from isopropanol; and (e) 1 - n - decyl-2-phenyl-4-(3-methyl-2-benzoxazolylidene - methyl) - 5,6,7,8 - tetrahydro-quinazolinium iodide, M.P. 190–191° after recrystallization from isopropanol.

The different starting materials may be obtained as follows:

20.2 g. of 2-methyl-benzoxazole and 64.0 g. of methyl iodide are dissolved in 100 ml. of acetone and the whole is stirred overnight at room temperature. The solid formed is filtered off and washed with acetone to yield the 2,3-dimethyl-benzoxazolinium iodide melting at 199–200°.

The mixture of 20.2 g. of 2-methyl-benzoxazole and 28.8 g. of ethyl iodide is heated in a sealed tube to 100° for 48 hours. Upon cooling the solid formed is recrystallized from ethanol to yield the 3-ethyl-2-methyl-benzoxazolinium iodide melting at 195–197°.

The corresponding 3-n-propyl-compound is prepared as the 3-ethyl compound from 30.0 g. of 2-methyl-benzoxazole and 45.9 g. of n-propyl iodide; M.P. 194–196°.

The 4-(3-methyl-2-benzoxazolylidene-methyl)-2-phenyl-5,6,7,8-tetrahydro-1,3-benzoxazinium iodide used as starting material for the compound listed under (e) melts at 269°.

The compound described in Example 12 may also be prepared according to the above described method from equivalent amounts of 4-(1-methyl-2-quinolylidene-methyl) - 2-phenyl - 5,6,7,8-tetrahydro - 1,3-benzoxazinium iodide (melting at 274–275°) and 4-fluoro-aniline.

EXAMPLE 16

The mixture of 2 g. of 4-(3-ethyl-2-benzothiazolylidene-methyl) - 2 - phenyl - 5,6,7,8 - tetrahydro-1,3-benzoxazinium iodide and 5 ml. of 4-fluoro-aniline is refluxed for one hour. After chilling the reaction mixture and adding a small amount of diethyl ether, a precipitate is formed, which is filtered off and washed with diethyl ether to yield the 1-(4-fluoro-phenyl)-2-phenyl-4-(3-ethyl-2-benzothiazolylidene-methyl) - 5,6,7,8 - tetrahydro-quinazolinium iodide of the formula

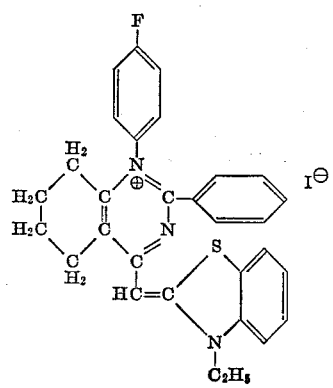

which melts at 285–287° after recrystallization from ethanol.

The starting material is prepared as shown in Example 8 and melts at 290–291°.

In the analogous manner the following compounds are prepared by using 2 g. of the iodide and 5 ml. of decylamine, 11 ml. of 4-dimethylamino-aniline or 5 ml. of 2-diethylaminoethylamine respectively:

(a) 1-n-decyl - 2-phenyl-4-(3-ethyl - 2-benzothiazolylidene-methyl) - 5,6,7,8-tetrahydro-quinazolinium iodide, M.P. 241–243° after recrystallization from ethanol, (b) 1-(4-dimethylamino-phenyl) - 2-phenyl - 4-(3-methyl - 2-benzothiazolylidene-methyl) - 5,6,7,8-tetrahydro-quinazolinium iodide, M.P. 314–315° after recrystallization from methanol, and (c) 1-(2-diethylamino-ethyl) - 2-phenyl - 4-(3-methyl-2-benzothiazolylidene-methyl) - 5,6,7,8-tetrahydro-quinazolinium iodide, M.P. 192–193° after recrystallization from ethanol.

EXAMPLE 17

Through the solution of 2.0 g. 1-(4-fluoro-phenyl)-4-methylmercapto - 2-phenyl - 5,6,7,8-tetrahydro-quinazolinium iodide in 300 ml. hot acetone, gaseous ammonia is bubbled through while the solution is refluxed for 2 hours. During the course of the reaction the evolution of methyl mercaptan can be detected. The solvent is removed under reduced pressure to yield the 1-(4-fluorophenyl)-4-imino-2-phenyl - 1,4,5,6,7,8 - hexahydro - quinazoline hydroiodide of the formula

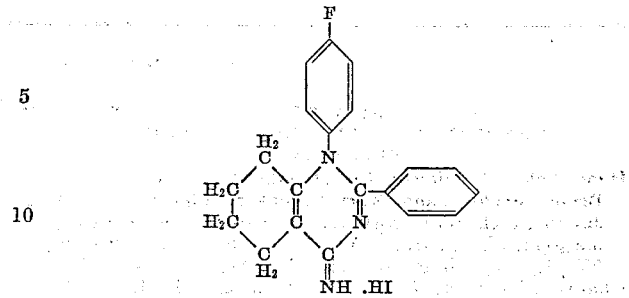

which melts after recrystallization from acetone at 288–290°.

EXAMPLE 18

According to the method described in Example 17, the following compounds are prepared from the same amount of the iodide mentioned and gaseous methylamine or ethylamine:

| Compound | M.P.,° | Recrystallized from— |
|---|---|---|
| 4-methylimino-1-(4-fluoro-phenyl)-2-phenyl-1,4,5,6,7,8-hexahydro-quinazoline hydroiodide. | 335–337 | Methanol. |
| 4-ethylimino-1-(4-fluoro-phenyl)-2-phenyl-1,4,5,6,7,8-hexahydro-quinazoline hydroiodide. | 121–123 | Isopropanol. |

EXAMPLE 19

To the solution of 1.0 g. 1-(4-fluoro-phenyl)-4-methylmercapto - 2 - phenyl - 5,6,7,8 - tetrahydro-quinazolinium iodide in 16 ml. acetone, 3.0 ml. n-propylamine is added causing an exothermic reaction. After refluxing the reddish mixture for 30 minutes it becomes pale yellow. The solvent is removed under reduced pressure to yield the 4-n-propylimino - 1-(4-fluoro-phenyl) - 2-phenyl-1,4,5,6,7,8-hexahydro-quinazoline hydroiodide of the formula

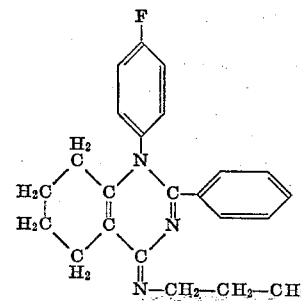

which melts after recrystallization from isopropanol at 127–128.5°.

EXAMPLE 20

Using in Example 19 instead of the n-propylamine the same amount of isopentylamine, 3-diethylamino-propylamine or 5 ml. n-butylamine, i-butylamine, tert. butylamine, n-pentylamine, n-hexylamine and 2-dimethylamino- or diethylamino-ethylamine, the following compounds are prepared:

| Compound | M.P.,° | Recrystallized from— |
|---|---|---|
| 4-isopentylimino-1-(4-fluoro-phenyl)-2-phenyl-1,4,5,6,7,8-hexahydro-quinazoline hydroiodide. | 172–174 | Isopropanol. |
| 4-(3-diethylamino-propyl-imino)-1-(4-fluoro-phenyl)-2-phenyl-1,4,5,6,7,8-hexahydro-quinazoline hydroiodide. | 195–197 | Isopropanol-diethyl ether. |
| 4-(2-dimethylamino-ethylimino)-1-(4-fluoro-phenyl)-2-phenyl-1,4,5,6,7,8-hexahydro-quinazoline hydroiodide. | 125–128 | Do. |
| Do. | 112–114 | Ethanol. |
| 4-n-butylimino-1-(4-fluoro-phenyl)-2-phenyl-1,4,5,6,7,8-hexahydro-quinazoline-hydroiodide. | 193–195 | Isopropanol. |
| Do. | 202–204 | Isopropanol-diethyl ether. |
| 4-tert. butylimino-1-(4-fluoro-phenyl)-2-phenyl-1,4,5,6,7,8-hexahydro-quinazoline hydroiodide. | 218–220 | Isopropanol. |
| 4-n-pentylimino-1-(4-fluoro-phenyl)-2-phenyl-1,4,5,6,7,8-hexahydro-quinazoline hydroiodide. | 182 | Do. |
| 4-n-hexylimino-1-(4-fluoro-phenyl)-2-phenyl-1,4,5,6,7,8-hexahydro-quinazoline hydroiodide. | 202–204 | Do. |

The compounds of the invention described in Examples 17 to 19 in most instances show a double melting point, only one of which is indicated therein. For example the 4-n-pentylimino-1-(4-fluoro-phenyl)-2-phenyl-1,4,5,6,7,8-hexahydro-quinazoline hydroiodide first melts at 102°, resolidifies and again melts at 182°.

EXAMPLE 21

The solution of 1.0 g. 1-(4-chloro-phenyl)-2-phenyl-4-methylmercapto - 5,6,7,8 - tetrahydro - quinazolinium iodide, 4 ml. 4-fluoro-aniline and 25 ml. acetone is refluxed for two days. Hereupon, it is evaporated in vacuo and the residue recrystallized from isopropanol to yield the 4 - (4 - fluoro - phenylimino) - 1 - (4 - chloro - phenyl)-2 - phenyl - 1,4,5,6,7,8 - hexahydro - quinazoline hydroiodide of the formula

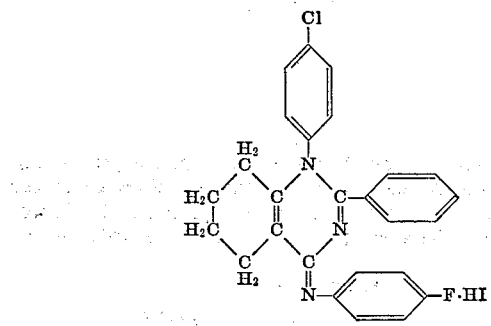

melting at 189–191°.

The starting material is prepared as follows: The mixture of 5.0 g. 2-phenyl-4-thio-5,6,7,8-tetrahydro-1,3-benzoxazine and 5.1 g. 4-chloro-aniline is heated in a sealed tube to 100° for six hours. The reaction mixture is suspended in acetone, the suspension filtered and the residue washed with acetone to yield the 1-(4-chloro-phenyl)-2-phenyl - 4 - thio - 5,6,7,8 - tetrahydro - quinazoline melting at 296–299°.

The mixture of 12.0 g. thereof, 100 ml. methyl iodide and 2.1 liters acetone is refluxed overnight. Hereupon it is evaporated in vacuo and the residue recrystallized from acetone to yield the 1-(4-chloro-phenyl)-2-phenyl-4-methylmercapto-5,6,7,8-tetrahydro-quinazoline iodide melting at 275–277°.

EXAMPLE 22

In the manner described in the previous examples the following compounds are prepared from equivalent amounts of the corresponding starting material:

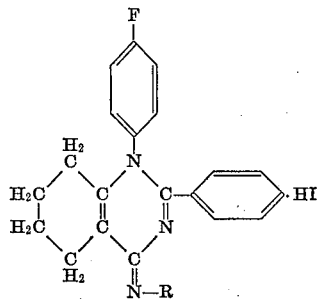

| R | M.P., ° | Recrystallized from— |
|---|---|---|
| i-C₃H₇ | 148–150 | Isopopanol. |
| CH₂—CH(CH₃)₂ | 171–174 | Isopopanol-diethyl ether. |
| —⟨phenyl⟩—OCH₃ | 245–247 | Do. |
| —⟨phenyl⟩—F | 242–244 | Isopropanol. |
| CH₂—C₆H₅ | 229–231 | Do. |
| CH₂—CH₂—N(n—C₃H₇)₂ | 181–183 | Acetone-diethyl ether. |
| CH₂—CH₂—CH₂—N(n-C₄H₉)₂ | 113–115 | Do. |
| CH₂—CH₂—N⟨morpholino⟩ | 195 | Isopropanol. |
| CH₂—CH₂—N⟨pyrrolidino⟩ | 219–221 | Isopropanol-diethyl ether. |
| CH₂—⟨oxazole⟩ | 195–197 | Isopropanol. |
| CH₂—COOC₂H₅ | 181–184 | Do. |
| 4-phenylimino-1,2-di-phenyl-1,4,5,6,7,8-hexahydro-quinazoline hydroiodide. | 294–296 | Do. |
| 4-(4-fluoro-phenylimino)-1,2-diphenyl-1,4,5,6,7,8-hexahydroquinazoline hydroiodide. | 288–290 | Do. |
| 4-(4-fluoro-phenylimino)-1-(4-fluoro-phenyl)-2-phenyl-1,4,5,6,7,8-hexahydro-quinazoline. | 241–244 | Acetone. |

What is claimed is:
1. A compound having the formulae

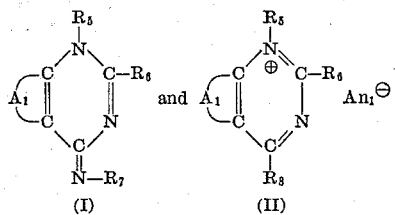

in which $A_1$ is alkylene having from three to five carbon atoms, each of the groups $R_5$ and $R_6$ is a member selected from the group consisting of alkyl having up to 12 carbon atoms, Ph-lower alkyl and Ph, wherein Ph is phenyl, (lower alkyl)-phenyl, (lower alkoxy)-phenyl, (halogeno)-phenyl, (lower alkylmercapto)-phenyl, (nitro)-phenyl or di- (lower alkylamino)-phenyl, $R_7$ is a member selected from the group consisting of hydrogen, lower alkyl, amino-lower alkyl, mono-lower alkylamino-lower alkyl, di-lower alkylamino-lower alkyl, alkyleneimino lower alkyl in which alkylene has from 4 to 6 carbon atoms, monoaza-lower alkyleneimino-lower alkyl, monooxa-lower alkyleneimino-lower alkyl and monothia-lower alkyleneimino-lower alkyl in which the heteroatom is separated from the ring-nitrogen by at least 2 carbon atoms and the ring has from 4 to 6 carbon atoms, carboxy-lower alkyl, and carbo-lower alkoxy-lower alkyl, $R_8$ is di-lower alkylamino and $An_1^{\ominus}$ is a hologenid ion, or a therapeutically acceptable acid addition salt of the compound of Formula I.

2. A compound as claimed in claim 1, in which Formulae $A_1$ is 1,4-butylene, $R_5$ is a member selected from the group consisting of alkyl with up to 12 carbon atoms, phenyl, (lower alkyl)-phenyl, (lower alkoxy)-phenyl, halogeno)-phenyl, (lower alkylmercapto)-phenyl and (nitro)-phenyl, $R_6$ is a member selected from the group consisting of phenyl, (lower alkyl)-phenyl, (lower alkoxy)-phenyl, (halogeno)-phenyl, (lower alkylmercapto)-phenyl and (nitro)-phenyl, $R_7$ is lower alkyl, $R_8$ is di-lower alkylamino, and $An_1^{\ominus}$ is a hologenid ion, or a therapeutically acceptable acid addition salt of the compound of Formula I.

3. A compound as claimed in claim 1 and having the formula

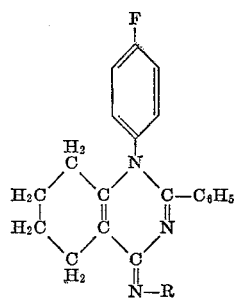

in which R is a member selected from the group consisting of hydrogen, methyl, ethyl, n-propyl, i-propyl, n-butyl, i-butyl, sec. butyl, tert. butyl, n-pentyl, i-pentyl, n-hexyl, 2-dimethylamino-ethyl, 2 - diethylamino - ethyl, 2-di-n-propylamino-ethyl, 3-diethylamino - propyl, 3 - di - n-butylamino-propyl, 2 - pyrrolidino-ethyl, 2 - morpholino-ethyl, ethoxycarbonylmethyl, benzyl, 4-methoxy-phenyl, 4-fluoro-phenyl and isoxazolyl(3)-methyl, or a therapeutically acceptable acid addition salt thereof.

4. A compound as claimed in claim 1 and having the formula

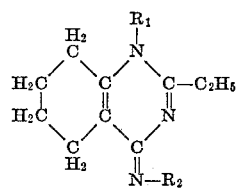

in which $R_1$ is a member selected from the group consisting of phenyl and 4-chloro-phenyl and $R_2$ is a member selected from the group consisting of phenyl and 4-fluoro-phenyl, or a therapeutically acceptable acid addition salt thereof.

References Cited

UNITED STATES PATENTS 3,385,850  5/1968  Carney et al. _____ 260—240.7
3,385,856  5/1968  Blatter et al. _____ 260—251

OTHER REFERENCES

De Stevens et al.: Amer. Chem. Soc. Absts. of Papers, 145th meeting, pp. 59Q to 60Q (Aug. 27, 1963).

Carney et al.: J. Org. Chem., vol. 29, pp. 2887–2889 (October 1964).

JOHN D. RANDOLPH, Primary Examiner

U.S. Cl. X.R.

96—101, 106; 260—240.7, 243, 244, 251, 256.4, 256.5, 563, 999